United States Patent [19]

Hagan et al.

[11] Patent Number: 4,587,139
[45] Date of Patent: May 6, 1986

[54] MAGNETIC DISK COATING METHOD AND APPARATUS

[75] Inventors: James A. Hagan; James E. Maloy; Myron A. W. Wilke, all of Rochester, Minn.

[73] Assignee: International Business Machines Corporation, Armonk, N.Y.

[21] Appl. No.: 685,087

[22] Filed: Dec. 21, 1984

[51] Int. Cl.$^4$ .............................................. B05D 5/12
[52] U.S. Cl. ..................................... 427/130; 118/52; 118/107; 118/240; 118/401; 118/409; 427/240; 427/377
[58] Field of Search ............... 427/240, 130, 128, 377; 118/52, 240, 401, 409, 107

[56] References Cited

U.S. PATENT DOCUMENTS

| | | | |
|---|---|---|---|
| 4,133,911 | 1/1979 | Koester et al. | 427/130 |
| 4,201,149 | 5/1980 | Koester et al. | 118/52 |
| 4,393,807 | 7/1983 | Fujimura et al. | 118/52 |
| 4,416,213 | 11/1983 | Sakiya | 118/52 |
| 4,485,758 | 12/1984 | Peugh et al. | 118/52 |

Primary Examiner—Sam Silverberg
Assistant Examiner—Janyce A. Bell
Attorney, Agent, or Firm—Robert W. Lahtinen

[57] ABSTRACT

A rigid magnetic disk substrate is spin coated using a closely confining, stationary air barrier adjacent the surface being coated. The coating is applied through a slotted opening in the air barrier which is progressively closed as the coating is applied and completely sealed during the spin-off operation. During the application of the coating, the air barrier is positioned approximately 0.15 inch from the disk substrate surface and prior to spin-off, the barrier is moved to a position 0.025 inch from the coated surface. Further, during the high speed spin-off cycle a high kinematic viscosity gas, such as helium, is introduced into the space between the barrier and the coated surface to establish a laminar flow condition and eliminate spoking of the coated material.

10 Claims, 2 Drawing Figures

MAGNETIC DISK COATING METHOD AND APPARATUS

FIELD OF THE INVENTION

The present invention relates to an improved method and apparatus for the manufacture of magnetic data storage disks carrying very thin magnetic layers, by applying a fluid dispersion of magnetic particles in a binder mixture to a rigid disk substrate by a spin coating process while controlling the coating thickness and minimizing surface irregularities.

BACKGROUND OF THE INVENTION

Magnetic data recording media in the form of rotating disks are extensively used as memories which allow rapid, random access to information stored on the disk. There is a continuing effort to increase the amount of information stored on a disk by increasing the density which is commonly referred to as areal density or bits per square inch. The density is dependent upon the properties of the magnetic particles and the thickness of the coating. In general, the thinner the coating, the higher the recording density can be. When higher densities and thinner coatings are used, the heads, which fly over the disk surface on a layer or film of air must brought closer to the coated surface of the disk. As the distance between the flying head and the disk surface is reduced, for example, from 12 to 18 microinches to a height of 1 to 6 microinches, it will be appreciated that the flatness of the recording surface must be even further improved.

A recognized technique for the manufacture of disk memories is the coating of an aluminum disk substrate with a liquid dispersion which contains a magnetizable material finely dispersed in a curable binder, subsequently drying and/or curing this coating and, if desired, also buffing and/or polishing it. A successful coating technique is the spin coating process, in which the disk substrate is caused to rotate and the coating mixture is allowed to flow onto it, as described for example in U.S. Pat. No. 3,198,657. To achieve a thin magnetic layer, the excess dispersion which has been applied is then spun off.

Subsequently it was found that, by placing an airflow barrier over a magnetic oxide coated disk during the spin off portion of the spin coat cycle, coating thickness could be reduced and other properties improved. This process requires placing a plate referred to as an air barrier over the disk surface during the spin-off process step. The air barrier reduces air circulation, thus permitting a solvent rich environment to form over the surface of the disk. This causes additional solvent evaporation to be slowed and as a result, the viscosity of the ink does not increase as rapidly during spin-off. With a lower viscosity, the coating will flow thinner and more uniformly resulting in a reduction in the as-coated thickness.

One air barrier approach is the use of a barrier that is corotating with the disk. This mode of operation is shown in U.S. Pat. No. 4,201,149 for the purpose of eliminating coating streaks that appear in a manner resembling the spokes of a wheel and usually occur when thin layer coatings are applied. The plate is positioned as mush as 20 mm above the coated disk and the disk and barrier are spun together producing the aerodynamic boundary layer that achieves the effect provided by the teaching. Another technique is to place a static air barrier plate over the disk surface during the spin-off step. This process is started by traversing a coating nozzle across a spinning disk during which the magnetic ink is applied. Once the nozzle has cleared the disk, the air barrier assembly is lowered over the disk surface in close proximity, often as close as 18 thousandths of an inch. This is immediately followed by a spin-off process step, orientation and a spin dry process. By having the air barrier over the disk during spin-off, a marked reduction in the as-coated thickness can be obtained. An example of this technique is U.S. patent application Ser. No. 500,067 filed June 1, 1983 now U.S. Pat. No. 4,485,755 (Coating Thickness and Wedge Geometry Control for Magnetic Disks).

An adverse phenomenon that may occur during the spin-off cycle is spoking, wherein streaks in the coating are formed that resemble the spokes of a wagon wheel. These coating streaks increase the roughness of the disk surface resulting in coating thickness variations that can not be buffed out.

SUMMARY OF THE INVENTION

Using the apparatus and technique of the present invention, the traversing ink jet nozzle is mounted on the air barrier assembly. The ink nozzle and a slide assembly are advanced across the spinning disk. As the ink nozzle and slide assembly traverse across the disk, ink is applied through a window and this window is closed by the slide as the nozzle traverses across the disk. Also as ink is applied to the disk, the spacing between the disk and the air barrier must not be so close that the applied ink will come in contact with the air barrier. This spacing during coating application is provided by a cam. Once the nozzle is turned off and the coating window is closed, the disk is accelerated to the spin-off speed. During this acceleration the coating thins and the cam is used to lower the air barrier to the operational spacing which is provided by a positive stop.

The time required to advance from the coating application process step to spin-off during which the solvent is evaporating is eliminated. Also solvent evaporation is retarded during the coating application process step by having the air barrier over the disk when the ink is applied.

The spoking problem has been eliminated by injecting a gas with high kinematic viscosity (helium or hydrogen) into the air barrier region between the air barrier and the coated disk substrate during spin-off. This causes a change in the flow within the region from turbulent (with air) to laminar. By retaining an atmosphere of high kinematic gas at the outside diameter of the disk to prevent mixing with air will ensure laminar flow in the critical outside diameter area of the disk.

DETAILED DESCRIPTION

Figure 1:
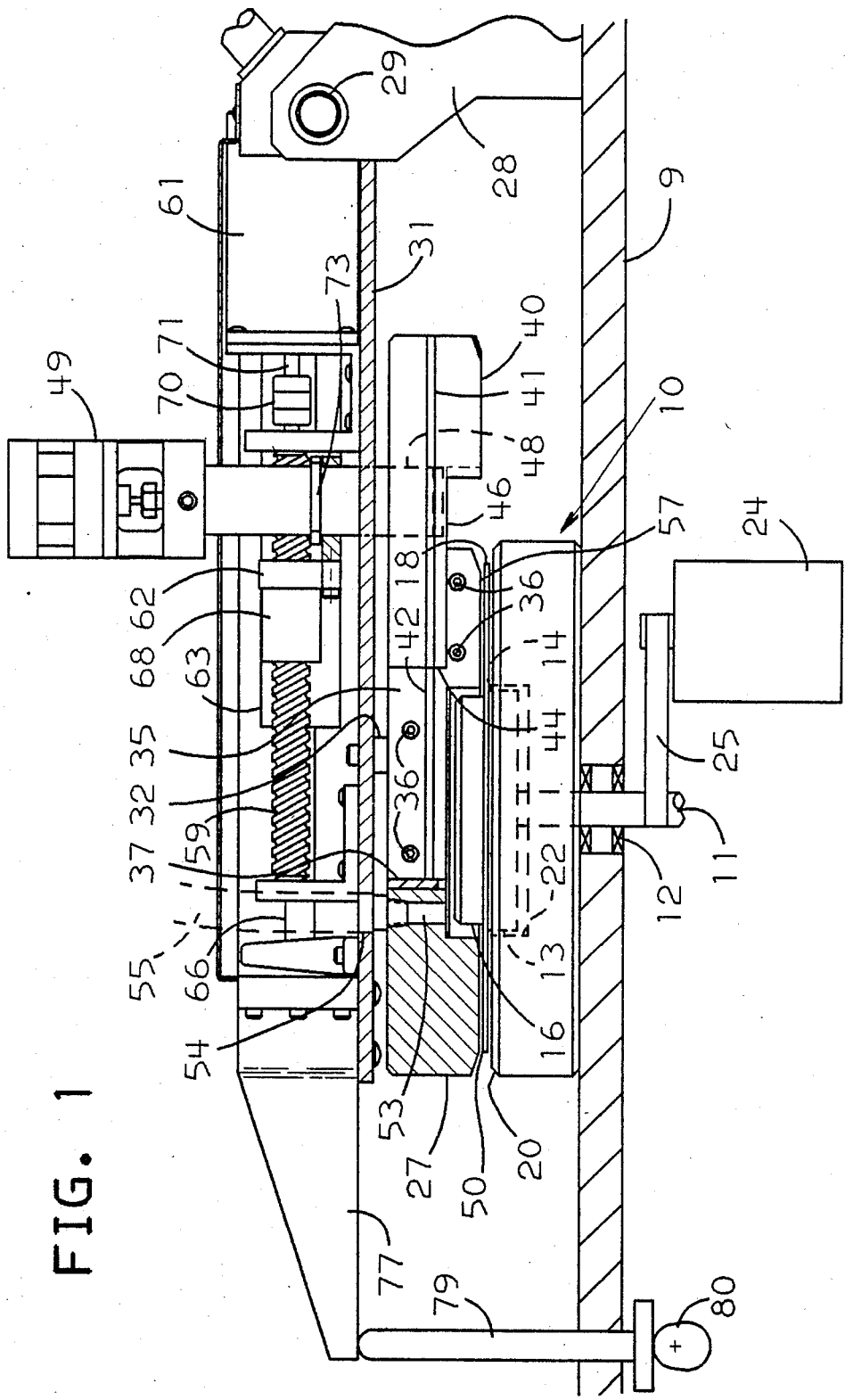
FIG. 1 is a side elevation, partly in section and partly broken away, of a spin coating device for applying a magnetic coating to magnetic disk substrates which incorporates the present invention.
Figure 2:
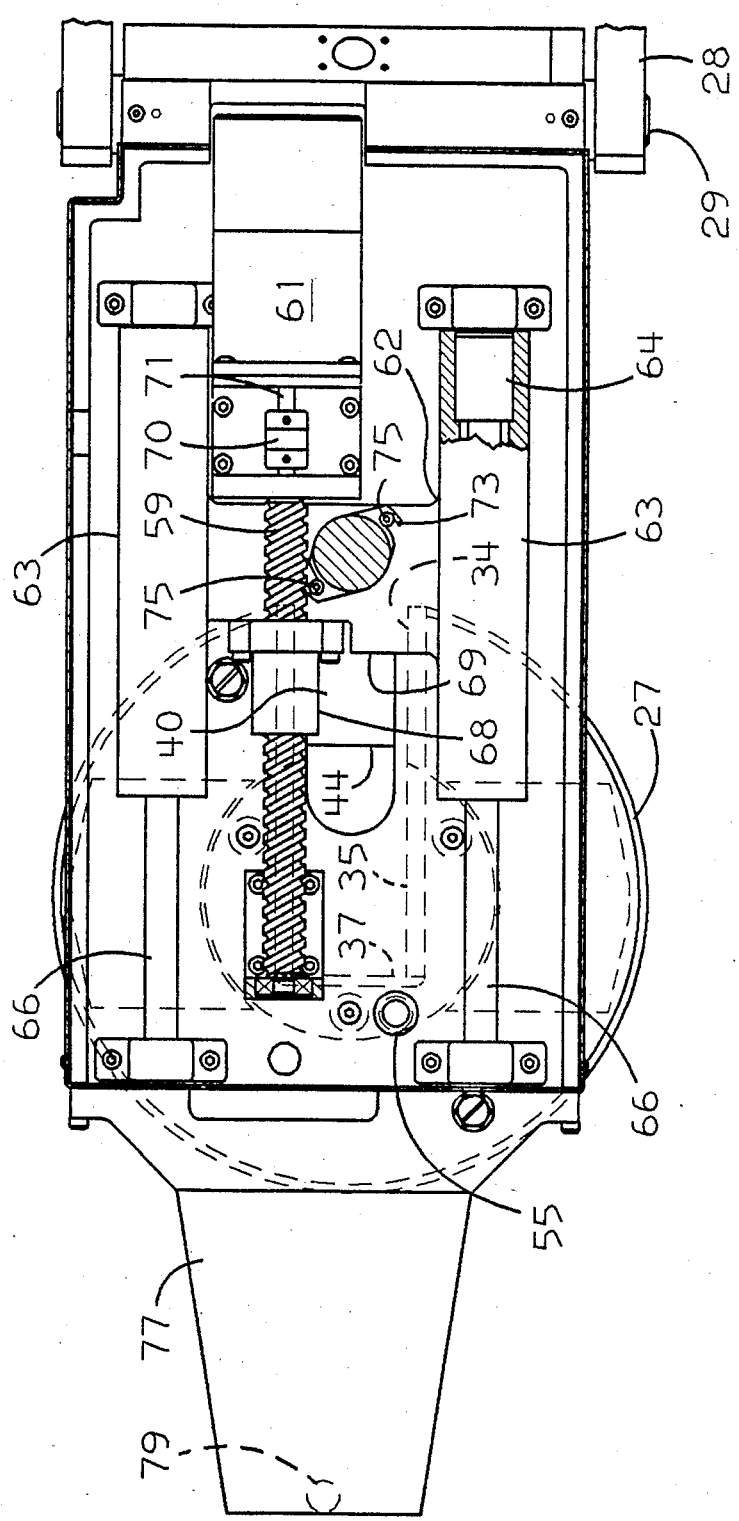
FIG. 2 is a partial plan view of the device of FIG. 1 which is partly in section, partly broken away and includes some concealed structural portions in phantom view.

Referring to FIGS. 1 and 2, the coating mechanism is carried by a base member 9 on which a lower orientation magnet assembly 10 is mounted. A shaft 11 mounted through an opening 12 in base 9 supports a platen 13 at one end thereof that presents a disk positioning shoulder 14 and a projecting boss 16 for receiving and positioning a rigid disk substrate 18 for rotation immediately above the upper surface 20 of lower orientation magnet assembly 10. The lower part of platen 13 extends into a circular recess 22 in lower orientation magnet assembly 10. A motor 24 is supported on base 9 by a means not shown and rotates platen 13 using a belt 25.

An air barrier-upper orientation magnet assembly 27 is pivotably mounted to a bracket 28 carried by base about the axis of a shaft 29. This permits the entire assembly 27 to be pivoted clockwise about the axis of shaft 29 for loading and unloading disk substrates which are to be coated. The upper orientation magnet assembly 27 is mounted to the plate member 31 by a series of studs 32, one of which is shown. This upper orientation magnet assembly 27 functions as the static plate-air barrier during the spin coating operation. The assembly 27 includes a U-shaped cutout portion 34 with side plates 35 retained by recessed bolts 36 along the leg surfaces of the U-shaped cutout 34 and a back plate 37 along the bite surface portion of the cutout 34. A slide 40 has a longitudinally extending projection or rail 41 formed at each side which is respectively received in a longitudinal recess 42 in the confronting side plate 35 to permit slide 40 to move between the extended position shown in the FIGS. 1 and 2 and a retracted position where the slide end surface 44 abuts and seals against the back plate 37. Slide 40 also has a circular opening 46 therethrough in which the cylindrical end 48 of the nozzle assembly 49 is received and sealed. When the slide 40 is in its retracted position with end surface 44 abutting end plate 37, the U-shaped cutout is totally closed to create a substantially continuous air barrier confronting the upper surface 50 of the disk substrate positioned in the coater. The cylindrical passageway 53, tubular connector 54 and tube 55 communicate with space between the lower surface 57 of the static plate-air barrier assembly and the upper surface 50 of disk substrate 18 to permit the introduction of a controlled atmosphere during the coating process.

The nozzle assembly 49 and slide 40 move in unison and are moved along a linearly reciprocating path by a lead screw 59 which is driven by a motor 61. A carriage 62 includes a pair of slide sections 63 that have bearing elements 64 that guide the carriage along the fixed cylindrical ways 66. The threaded coupler 68 is attached to the carriage web 69 and engages the lead screw threads. A coupler 70 connects the output shaft 71 of motor 61 with the lead screw 59 for unitary rotational motion. The nozzle assembly 49 carries a flange 73 that includes slotted openings 74 through which bolts 75 secure the assembly to web 69 of carriage 62.

A rigid arm 77 is secured as a projecting portion of the air barrier-upper orientation magnet assembly and engages a movable positioning stop 79. The positioning stop 79 has two positions; a first, which is shown in FIG. 1 and used during the spinoff procedure wherein the lower surface 57 of the air barrier is parallel to and closely confronting the disk surface 50 being coated and a second, established when the cam 80 is rotated 180 degrees to pivot the assembly about the axis of shaft 29 to elevate the air barrier with respect to the disk surface 50 being coated as the ink or magnetic coating formulation is applied. In the lowered position of the air barrier assembly 27 used during the spin-off cycle as shown in FIG. 1, the clearance between disk surface 50 and barrier surface 57, the clearance therebetween is in the range of 0.018 to 0.030 inch with a nominal value of 0.025 inch. During the initial operation as coating material is sprayed from the nozzle assembly 49 onto disk surface 50, the cam 80 is rotated 180 degrees from the position shown in FIG. 1 to elevate the barrier assembly 27 and assure that the sprayed coating material will not contact the air barrier surface 57 or any other coating device surface. In the elevated position, a separation between disk surface 50 and barrier surface 57 of 0.150 to 0.180 inch is maintained at the peripheral location nearest the stop 79.

The air barrier spin coating using the apparatus of FIGS. 1 and 2, has an initial coating cycle during which the coating formulation is applied and a subsequent spin cycle during which the excess coating material is spun off to form a thin, smooth, uniform coating that is prepared for the binder cure cycle. After the disk substrate to be coated has been mounted on platen 13 and the cam 80 rotated 180 degrees from the rotational position shown in FIG. 1, the motor 24 causes the substrate and platen to rotate at a first rotational speed. The coating is applied at a low rotational speed such as 400 RPM to spread a continuous substantially uniform layer of the magnetic particles dispersed in a curable binder. With the positive stop 79 extended to raise the air barrier assembly, the nozzle assembly 49 is advanced from the position shown in FIG. 1 and activated to spray coating formulation while over the surface of disk substrate. Thereafter the carriage continues to move until the slide 40 end surface 44 abuts the back plate 37. This causes the upper air barrier-orientation magnet member cutout to be wholly closed. The ink or coating formulation is thus applied without having the applied ink contact the air barrier or surfaces of platen.

The cam 80 is thereafter rotated 180 degrees to cause the upper air barrier assembly 27 to be lowered to a closely confronting parallel position to place the barrier surface parallel to and about 18 thousandths of an inch above the coated surface 50 of the disk 18. The platen and disk rotational speed is then increased to 3000 to 5500 RPM. The evaporation of binder solvent is slowed as a solvent rich atmosphere is built up in the confined volume over the surface of the disk. The openings in the upper air barrier confronting the newly coated surface are sealed off, preventing the aspiration of air into the space between the disk and air barrier. This reduced evaporation of solvent during the entire spin operation causes the coating formulation to flow thinner and results in a reduced thickness coating. Such an attribute is especially useful with magnetic inks where a high viscosity is needed to prevent sedimentation and flocculation of the magnetic particles.

During spin off a high rotational speed is required to obtain an ultrathin coating. However, this high speed often causes radial coating streaks called spoking. Spoking is primarily caused by currents in the atmosphere confronting the disk surface produced by the rapid disk rotation which act on the still fluid magnetic dispersion. The spoking phenomena occurs especially with large diameter disk substrates, such as 14 inch disks and with well dispersed magnetic inks. It has been found that by introducing a low atomic weight gas, such as helium, through tube 55 into the atmosphere confronting the newly coated disk surface during spin off, spoking can be eliminated. The low atomic weight gas, such as helium will, because of its high kinematic viscosity, cause the atmosphere in the region between barrier surface 57 and disk surface 50 to have laminar flow characteristics. When the Reynolds number associated with the atmosphere is less than $3 \times 10^5$ the flow is laminar and when greater than $3 \times 10^5$ the flow is turbulent. The dimensionless Reynolds number is defined:

$$R = Ur/v$$

wherein U is linear velocity, r is the radius and v is kinematic viscosity. When coating a disk with a 7 inch radius and using a spin-off velocity of 4000 revolutions per minute:

$$R_{air} = 8.7 \times 10^5 \text{ (turbulent)}$$

$$R_{He} = 1.1 \times 10^5 \text{ (laminar)}$$

Therefore, laminar flow conditions can be obtained by creating a helium atmosphere in the barrier region. This is done during spin-off by introducing helium gas at a rate between 1.5 grams per minute and 3.5 grams per minute through tube 55.

What is claimed is:

1. A spin coating apparatus for applying an ultra thin coating of a liquid magnetic material containing a volatile solvent on a rigid disk substrate comprising
   means for rotatably mounting said disk;
   means for rotating said disk at a first rotational speed and a second, higher rotational speed;
   a closely confining barrier wall surface at one axial side of said disk;
   an opening in said barrier wall surface;
   dispensing means positioned at said opening for applying said liquid magnetic coating material to the disk surface at said on axial side through said opening;
   closure means for selectively closing said opening in said barrier wall surface; and
   means for positioning said barrier wall surface at a first distance from said disk surface which exceeds the maximum thickness of the liquid coating material applied by said dispensing means, said dispensing means being positioned to deliver said liquid magnetic material to said disk surface through said barrier wall opening while said disk is rotated at said first rotational speed and subsequently positioning said barrier wall surface at a second lesser distance, not exceeding 0.05 inch, at which position said opening is closed by said closure means and said disk is rotated at said second rotational speed.

2. The spin coating apparatus of claim 1 wherein said opening is a radial slot;
   said dispensing means moves radially while applying said magnetic coating material through said opening; and
   said closure means moves in unison with said dispensing means during application of said magnetic coating material.

3. The spin coating apparatus of claim 2 wherein said closure means is connected to said dispensing means causing unitary motion to progressively close said slot during application of said coating material as said dispensing means is radially advanced and prior to a subsequent high rotational velocity spin-off cycle at said second rotational speed.

4. The spin coating apparatus of claim 2 further comprising means for delivering gas having a high kinematic viscosity into the space between said disk surface and said barrier wall surface.

5. The spin coating apparatus of claim 1 wherein said barrier wall and said closure means, when positioned to close said barrier wall opening, define a single, coplanar barrier surface disposed in parallel relation to said disk surface throughout the surface area of said disk coated by said dispensing means.

6. The process of applying an ultra thin coating of a liquid magnetic material containing a volatile solvent to a rigid disk surface at one axial side of said disk comprising
   mounting said disk for rotation with said disk surface adjacent a barrier wall surface;
   applying said liquid magnetic material to said disk surface through an opening in said barrier wall surface as said disk is rotated at a first rotational speed with the distance between said disk and barrier wall surfaces exceeding the maximum thickness of liquid magnetic material applied to said disk surface by said dispensing means;
   closing said barrier wall opening and reducing the separation between said disk and barrier wall surfaces to a distance not exceeding 0.05 inch; and
   rotating said disk at a second rotational speed which exceeds said first rotational speed to spin off excess liquid magnetic material.

7. The process of claim 6 wherein the step of applying said magnetic material comprises moving a liquid dispensing nozzle radially inward to apply said liquid magnetic material through said opening.

8. The process of claim 7 wherein said opening in said barrier wall surface is a slotted opening with a movable closure member disposed therein and the step of closing said opening comprises moving said closure member in unison with said nozzle to progressively close said slotted opening.

9. The process of claim 6 further comprising the step of introducing a high kinematic viscosity gas into the space between said disk and said confining surface during the step of spinning off excess liquid magnetic material.

10. The process of claim 9 wherein said high kinematic viscosity gas is helium.

* * * * *